United States Patent [19]
Stokes

[11] Patent Number: 5,881,209
[45] Date of Patent: Mar. 9, 1999

[54] METHOD AND SYSTEM FOR AUTOMATICALLY GENERATING PRINTER PROFILES

[75] Inventor: Michael Stokes, Cupertino, Calif.

[73] Assignee: Apple Computer, Inc., Cupertino, Calif.

[21] Appl. No.: 304,844

[22] Filed: Sep. 13, 1994

[51] Int. Cl.$^6$ .............................. G06K 15/00; H04N 1/46; G03F 3/08
[52] U.S. Cl. ......................... 395/109; 358/504; 358/518
[58] Field of Search ................................. 395/109, 101; 382/252; 358/504, 518, 523, 524, 520, 501

[56] References Cited

U.S. PATENT DOCUMENTS

| | | | |
|---|---|---|---|
| 4,929,978 | 5/1990 | Kanamori et al. | 358/520 |
| 5,313,291 | 5/1994 | Appel et al. | 358/501 |
| 5,333,069 | 7/1994 | Spence | 358/518 |
| 5,416,613 | 5/1995 | Rolleston et al. | 358/518 |
| 5,452,112 | 9/1995 | Wan et al. | 358/504 |
| 5,489,998 | 2/1996 | Yamada et al. | 358/518 |
| 5,528,261 | 6/1996 | Holt et al. | 345/150 |

FOREIGN PATENT DOCUMENTS

| | | |
|---|---|---|
| 475 554 | 3/1992 | European Pat. Off. . |
| 590 921 | 4/1994 | European Pat. Off. . |
| 626 782 | 11/1994 | European Pat. Off. . |
| 676 892 | 10/1995 | European Pat. Off. . |

OTHER PUBLICATIONS

*International Search Report,* International Appln. No. PCT/US95/11585: Date of Mailing: 1 Feb., 1996.

James M. Kasson et al., *"An Analysis of Selected Computer Interchange Color Spaces"*, ACM Transactions on Graphics, vol. 11, No. 4, pp. 373–405 (11 Oct. 1992).

*Graphic Technology—Spectral Measurement and Colorimetric Computation for Graphic Arts Images,* American National Standard, (Publication) CGATS.5–1993.

*Primary Examiner*—Joseph Mancuso
*Assistant Examiner*—Tracy M. Legree
*Attorney, Agent, or Firm*—Burns, Doane, Swecker & Mathis, L.L.P.

[57] ABSTRACT

Methods and systems for automatically generating printer profiles for color printers to evenly distribute translation errors between device color spaces are described. Since the color spaces of source devices, e.g., monitors and scanners, differs from that of destination devices, e.g., printers, translation is necessary. As some colors may be available to source devices which are not available to destination devices, this translation is inherently imperfect. Moreover, conventional techniques apply imperfect models of the color space which further skew the results. According to the novel methods and systems described herein, a nonlinear regression technique is applied in an automated system which reduces perceptual changes.

15 Claims, 14 Drawing Sheets

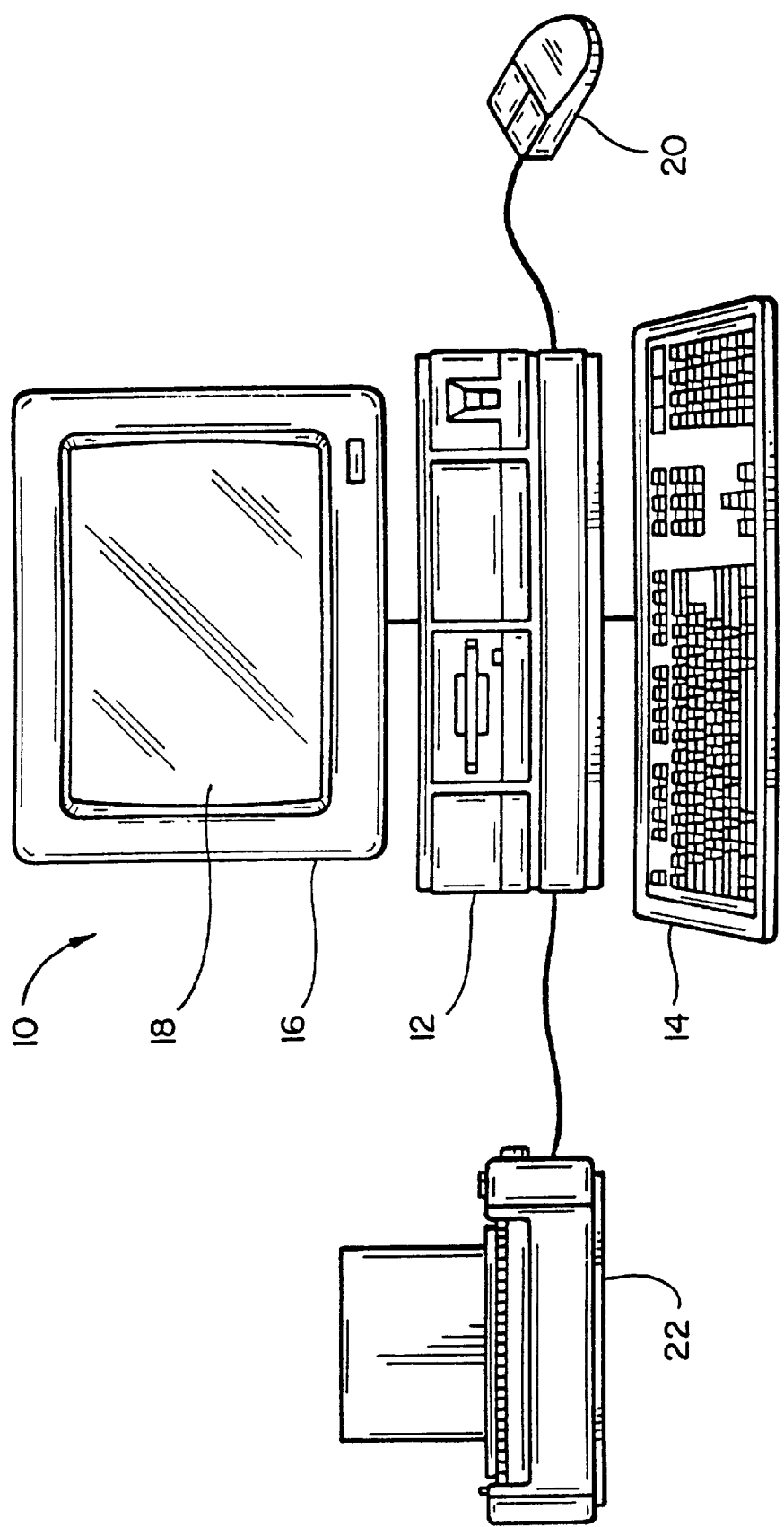
FIG_1

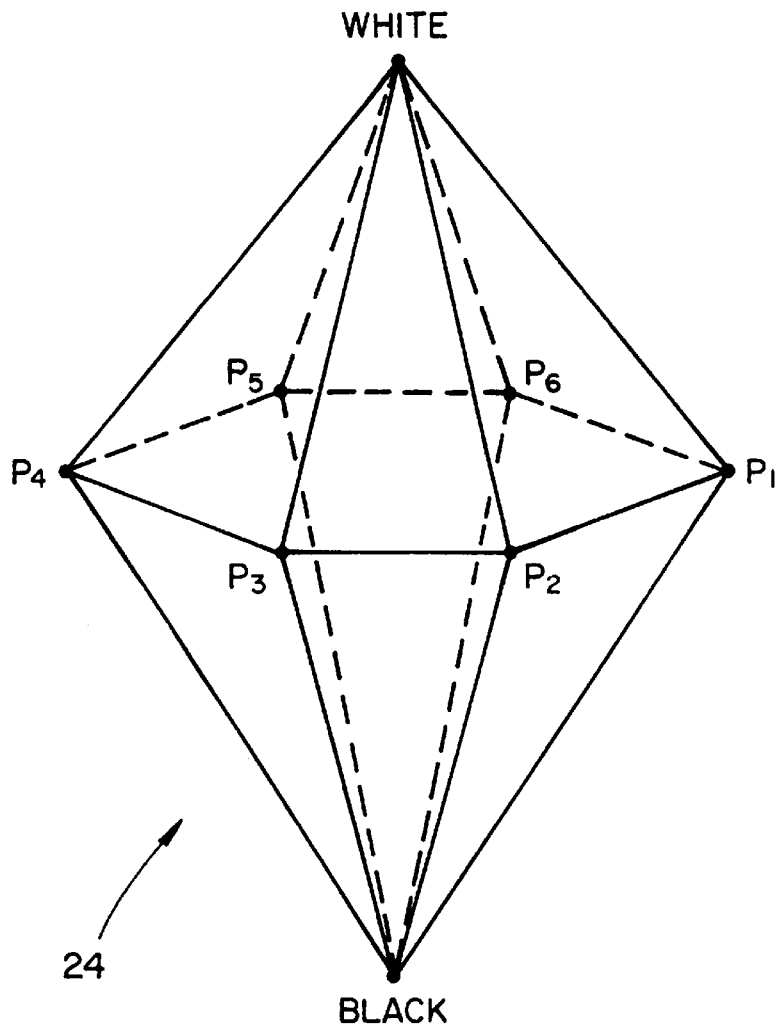
*FIG_2a*
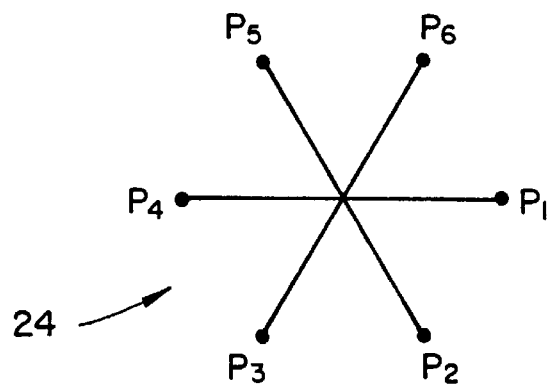
*FIG_2b*

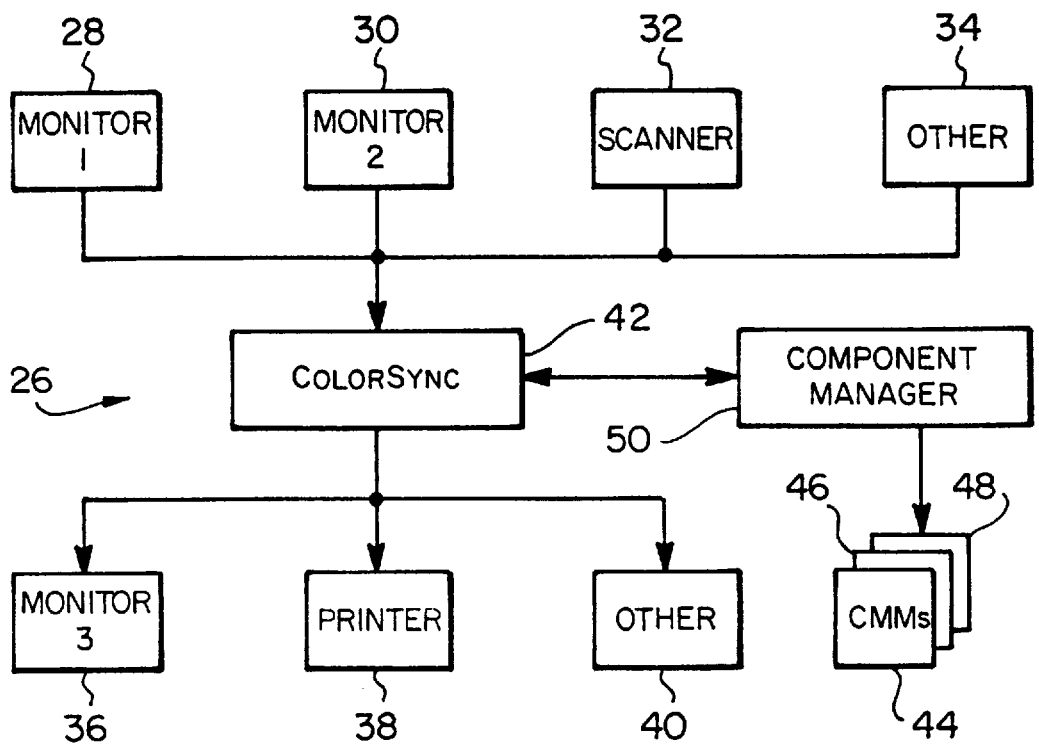
FIG_3
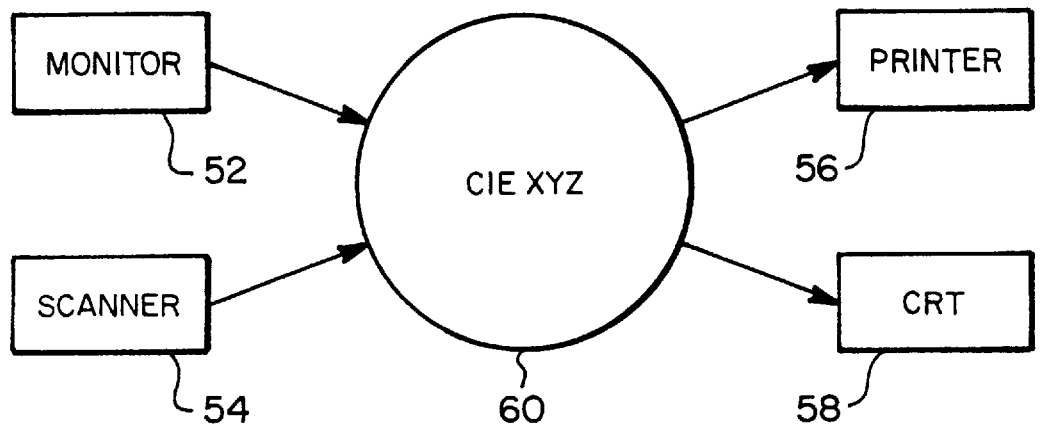
FIG_4

XYZ ⟶ KPS ⟶ CMY ⟶ cmy ⟶ rgb
*FIG_5a*
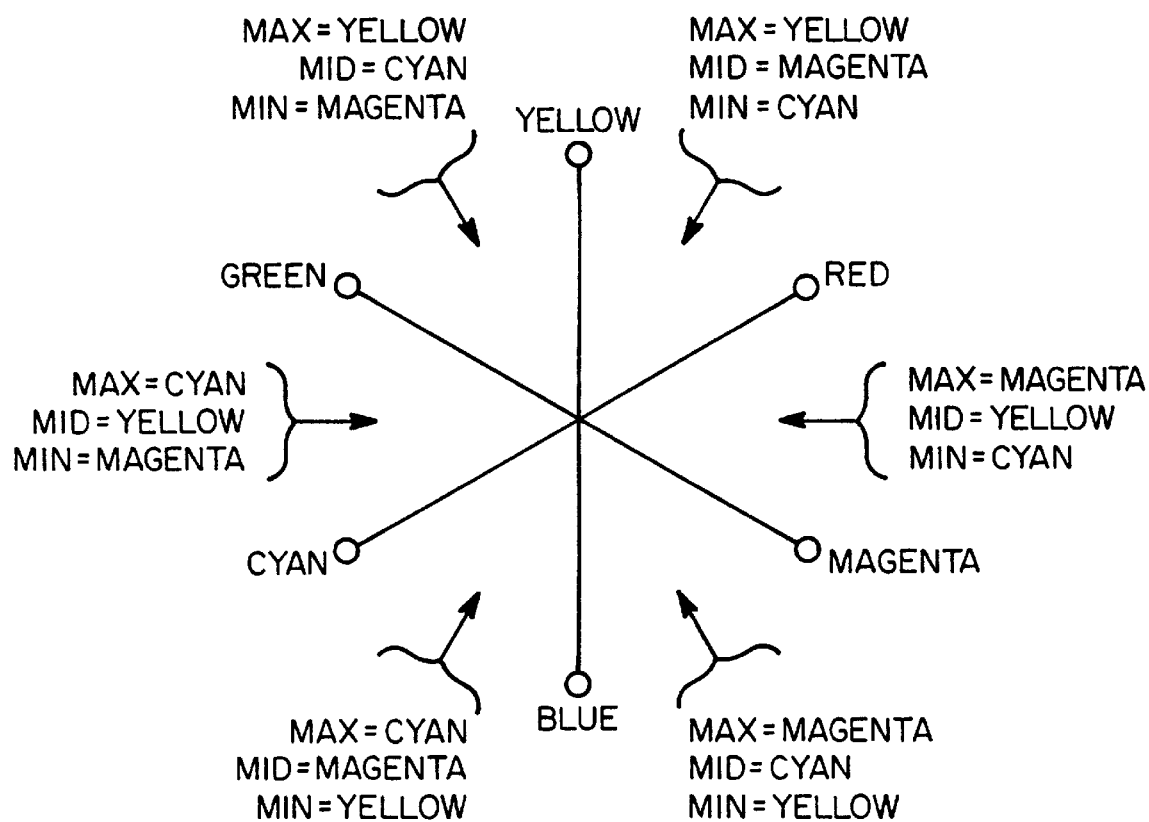
*FIG_5b*

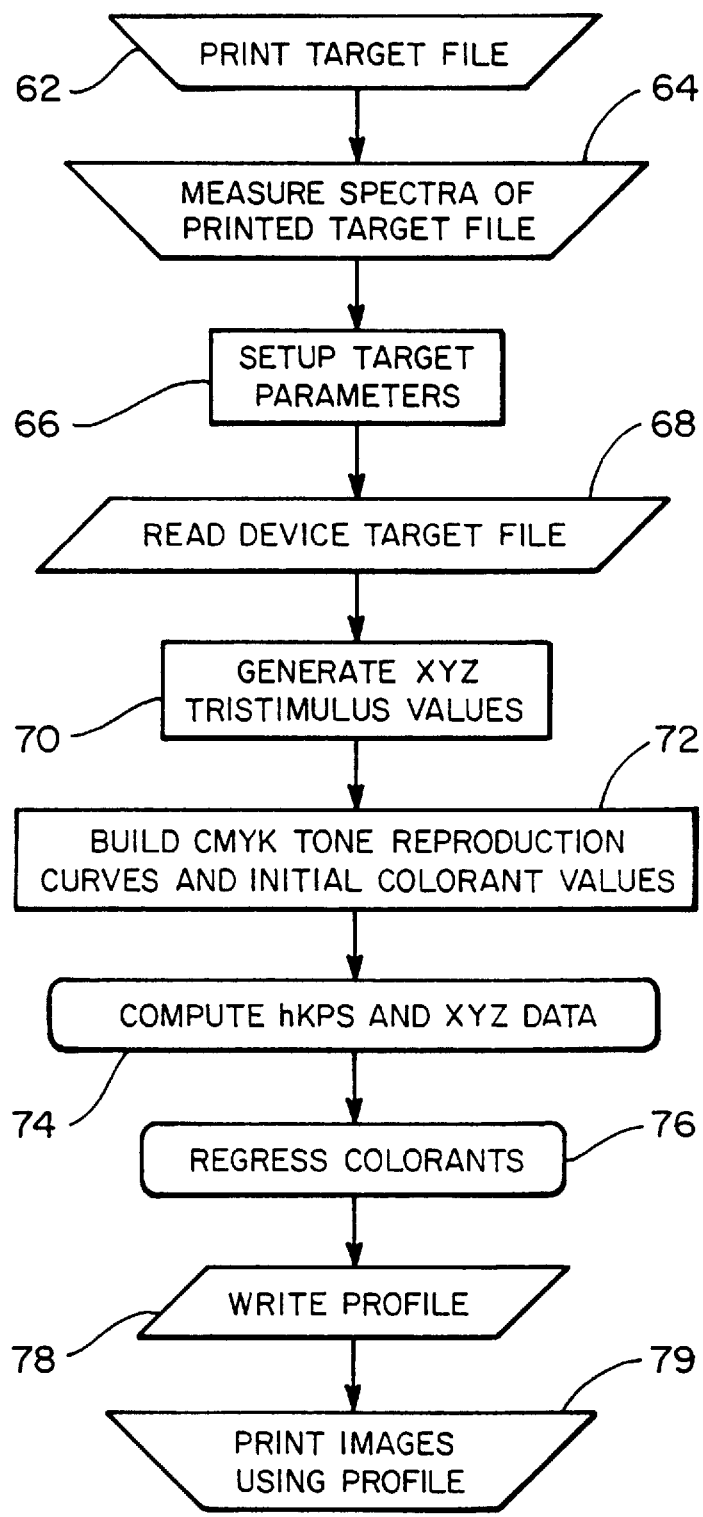
FIG_6

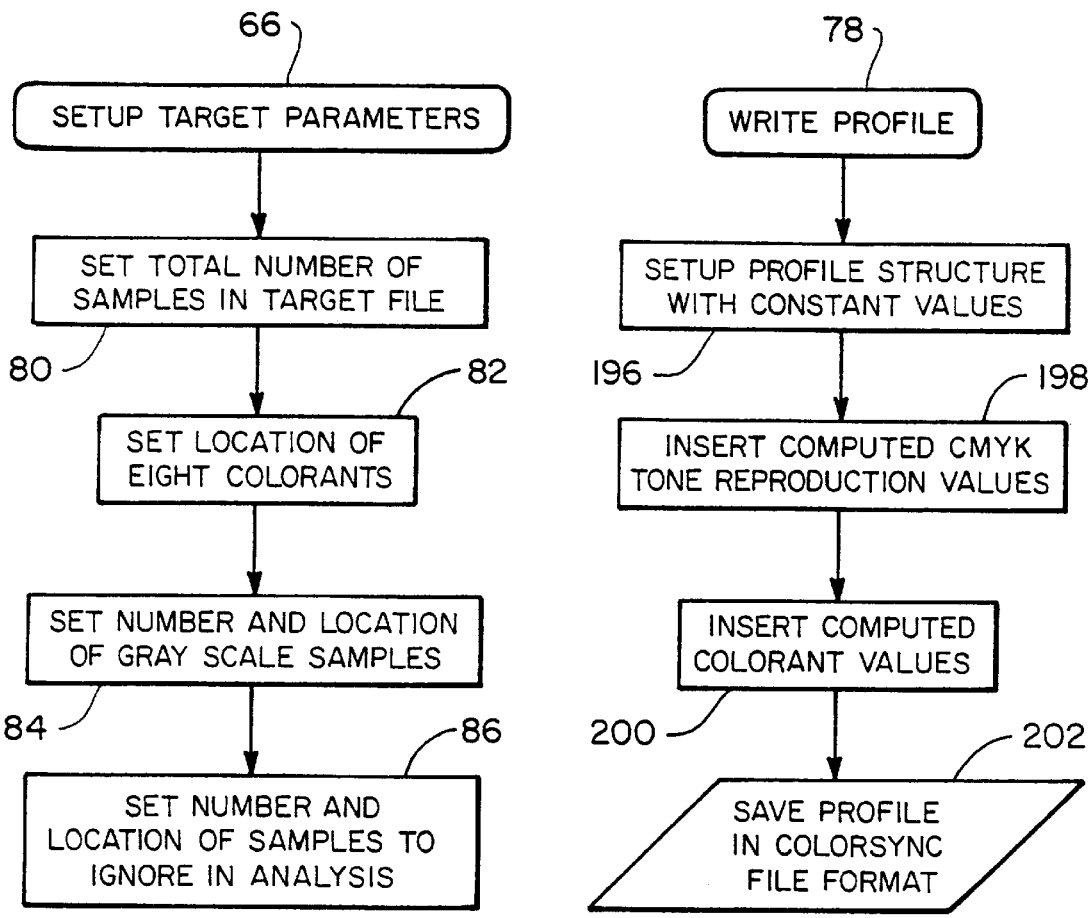

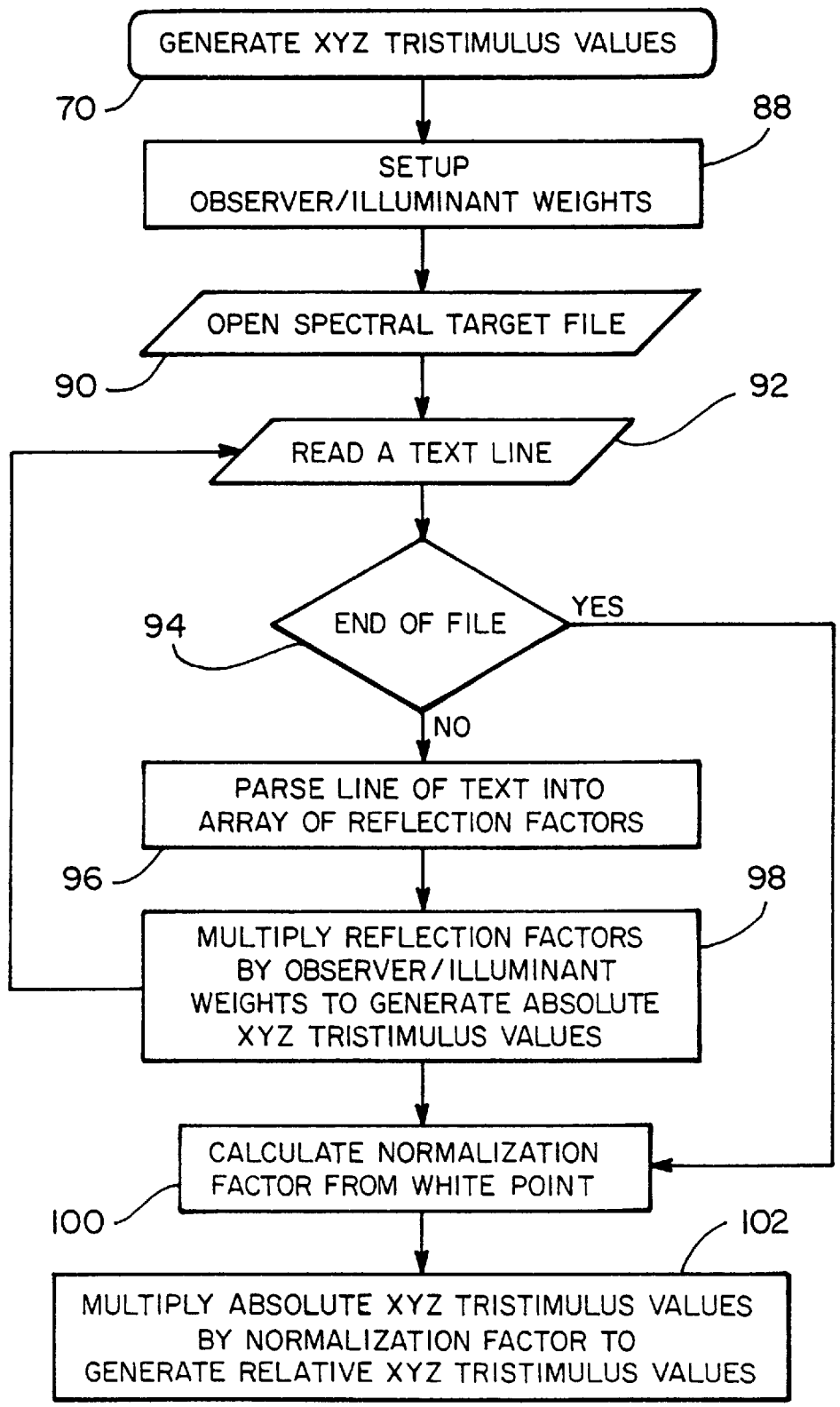
FIG_8

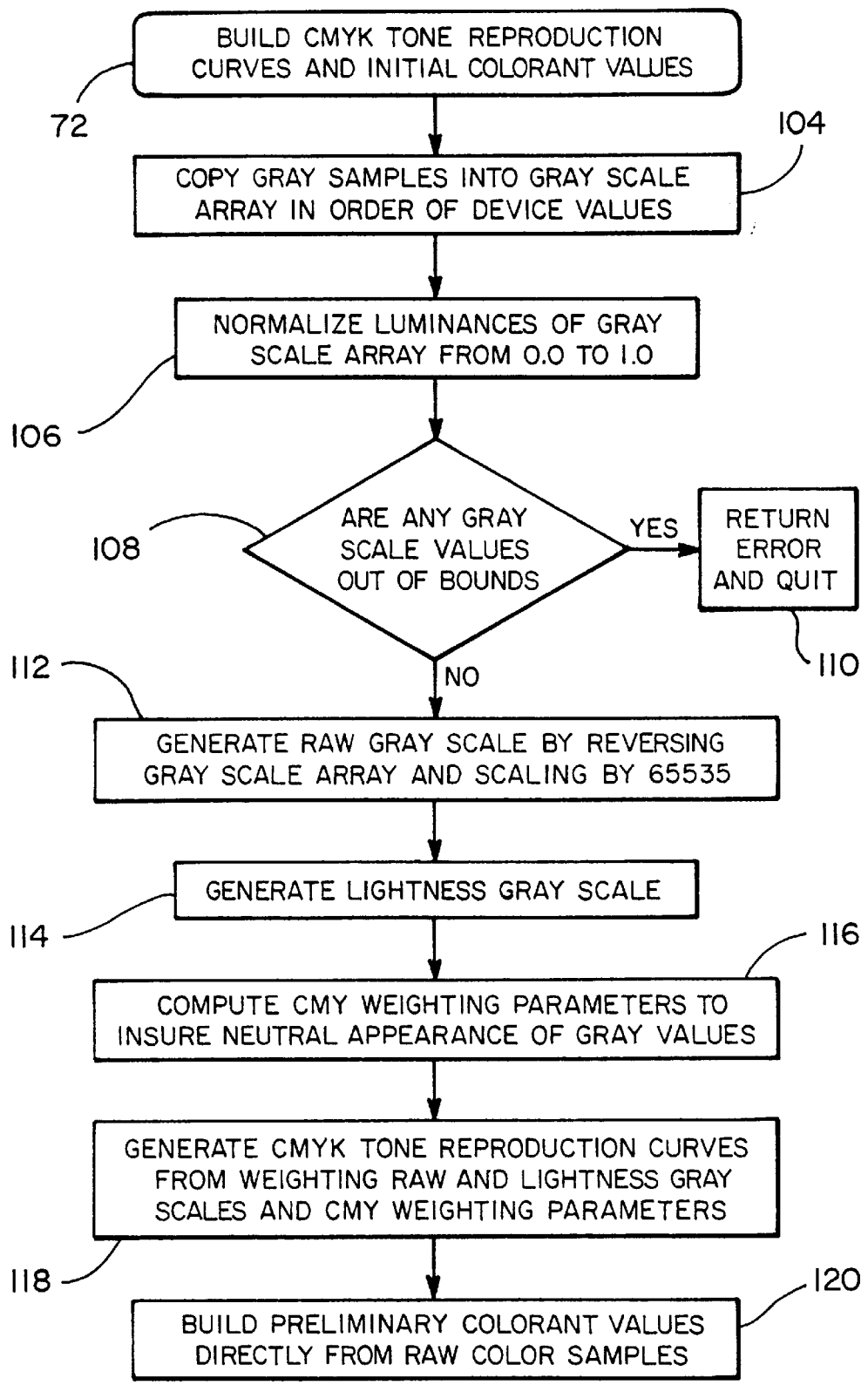
FIG_9

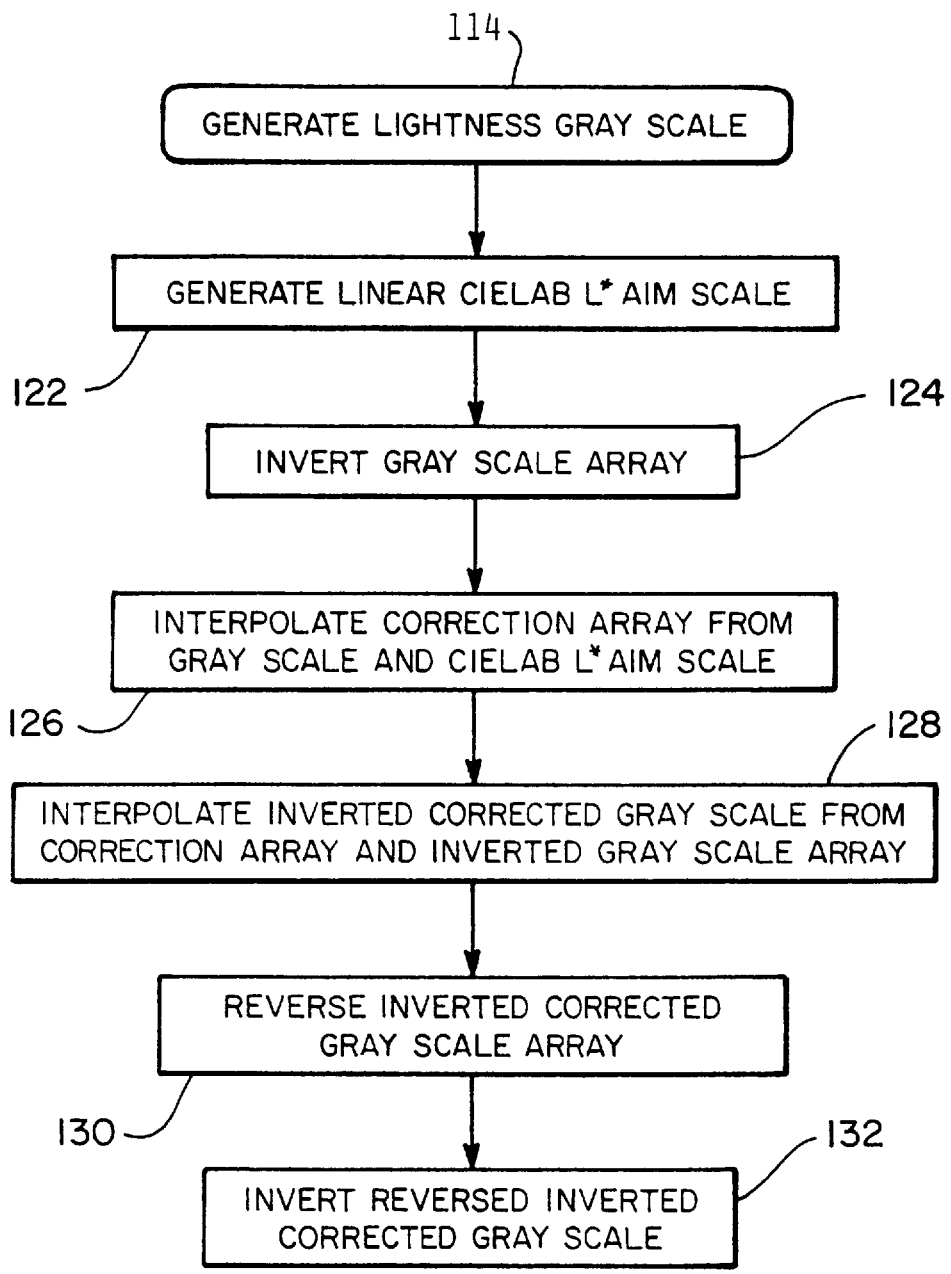
FIG_10

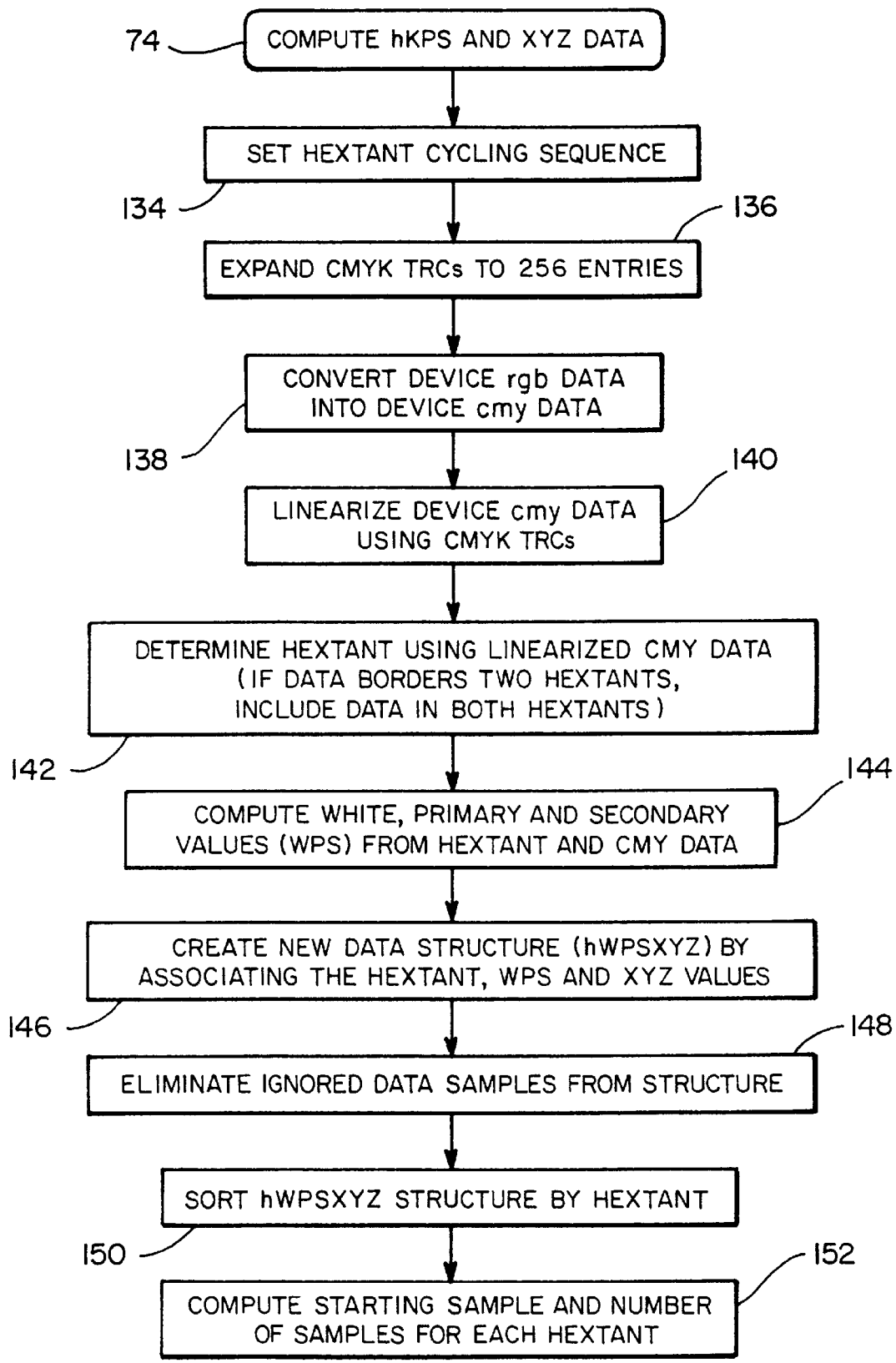
FIG_11

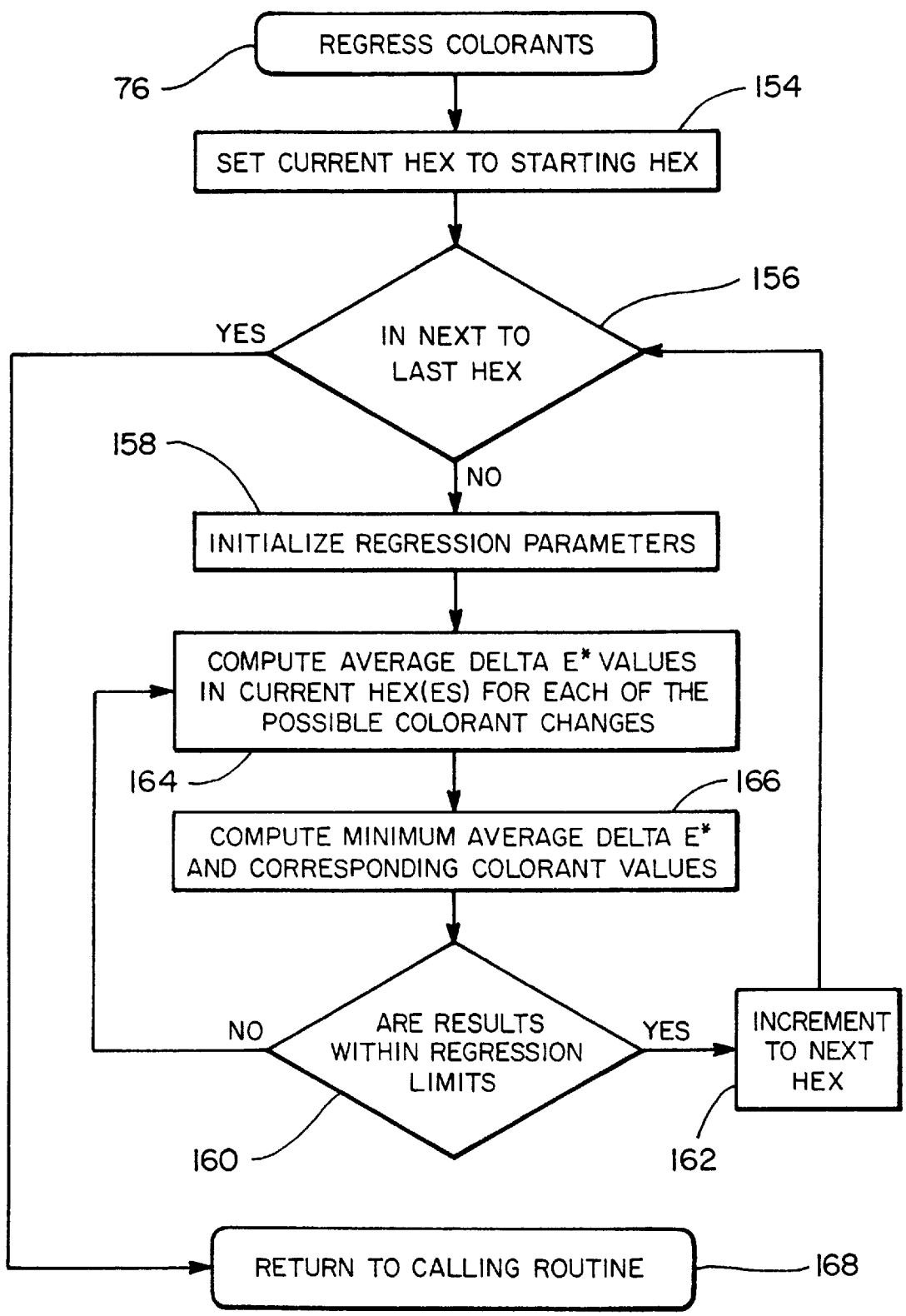
FIG_12

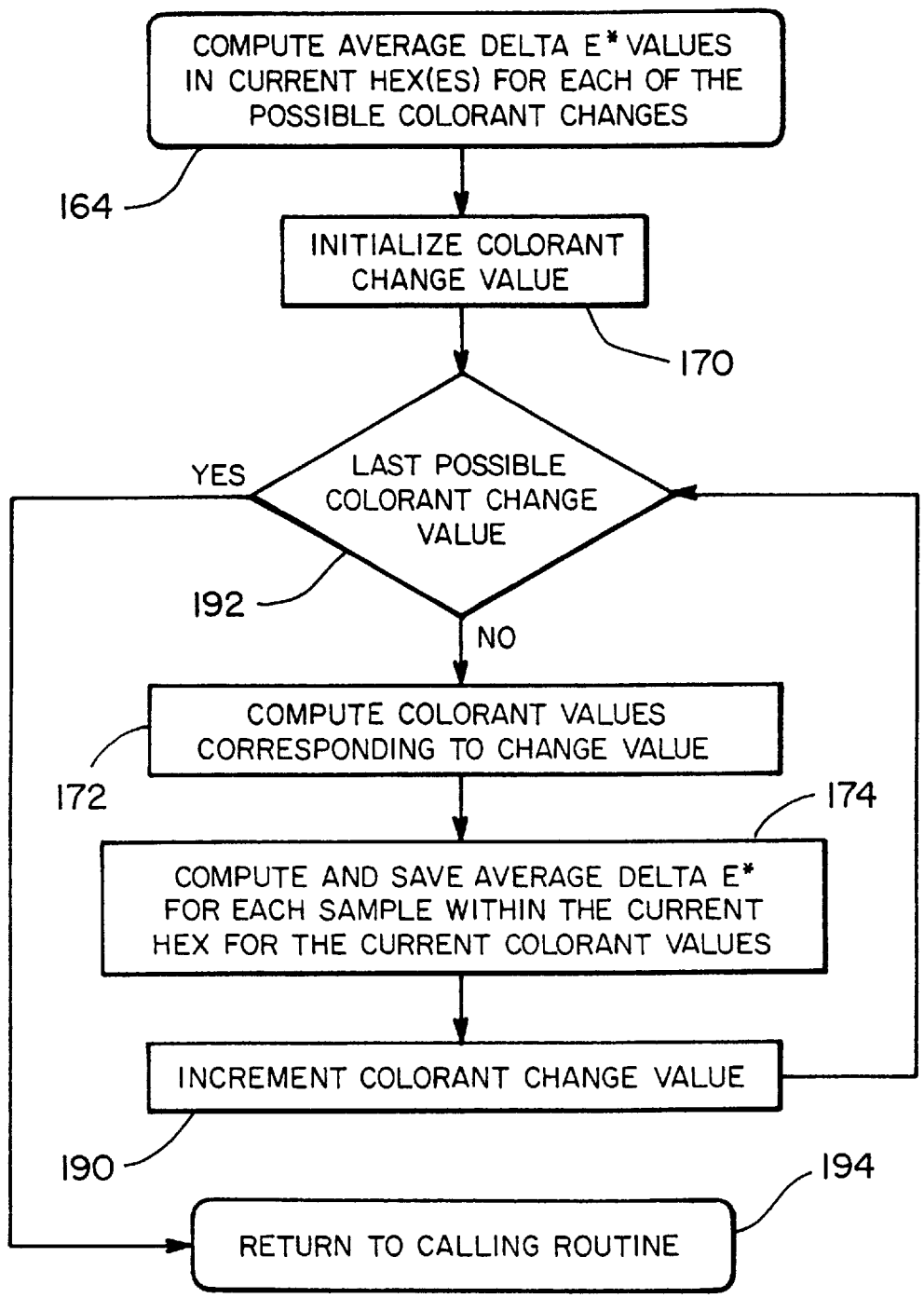
FIG_13

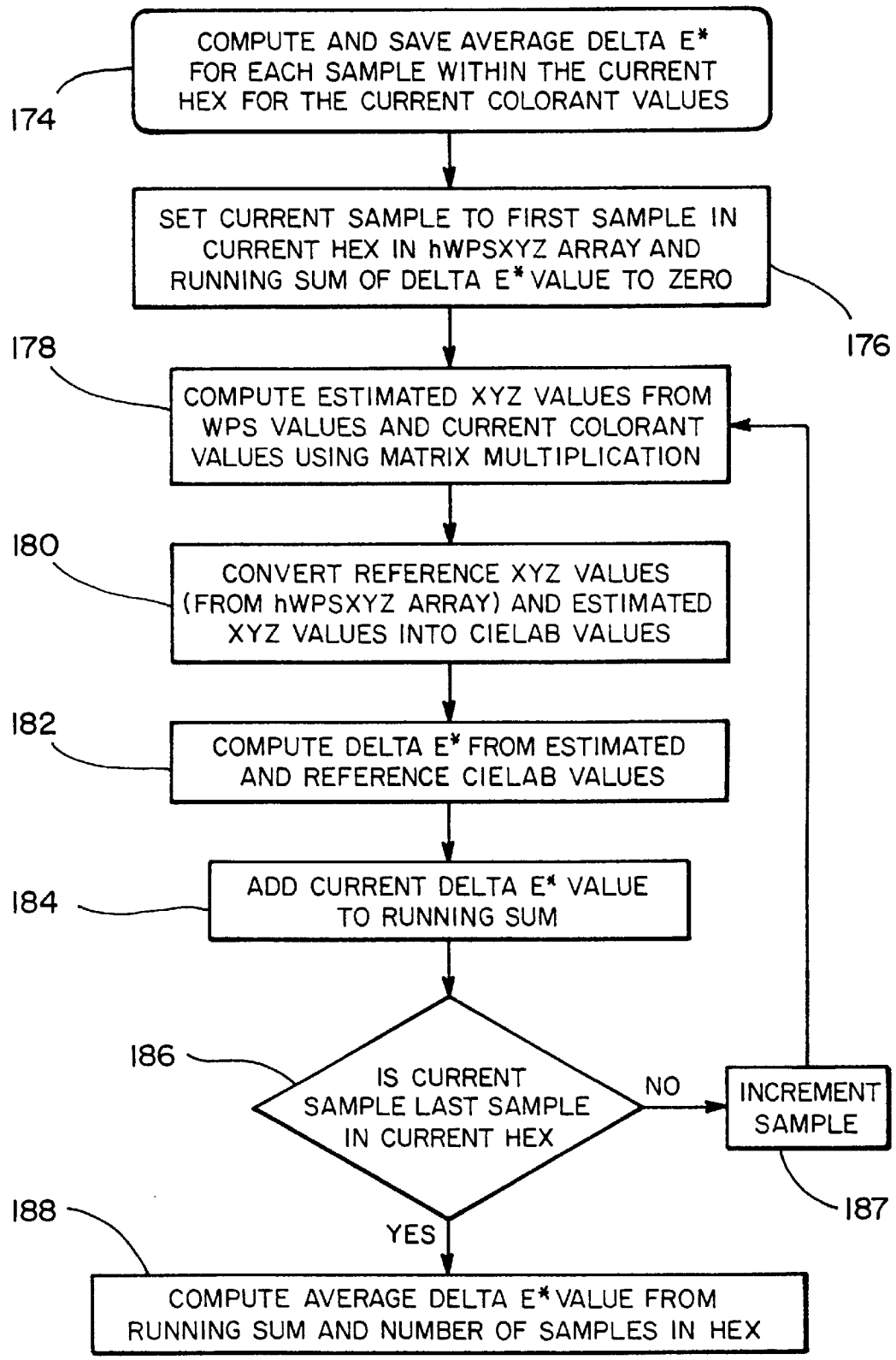
FIG_14

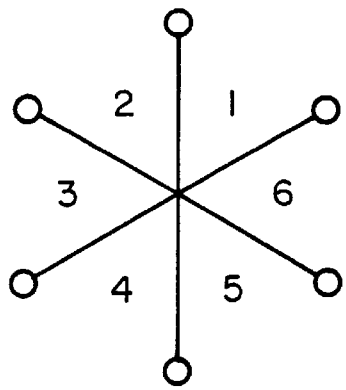
FIG_15a
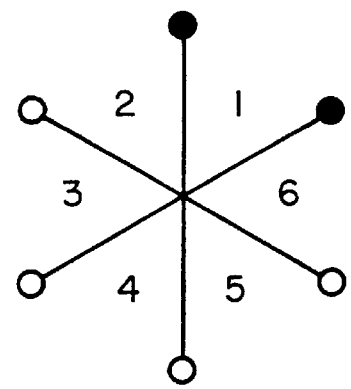
FIG_15b
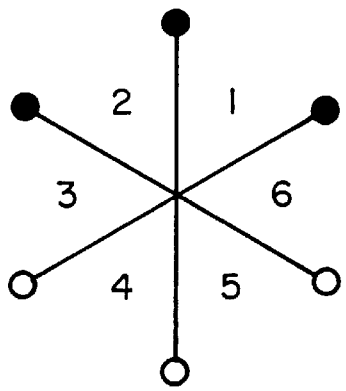
FIG_15c
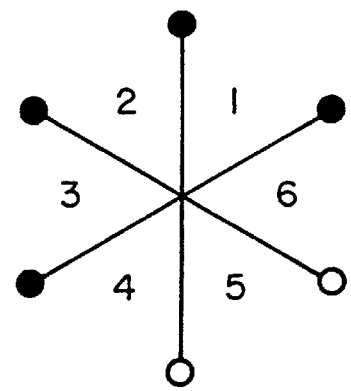
FIG_15d
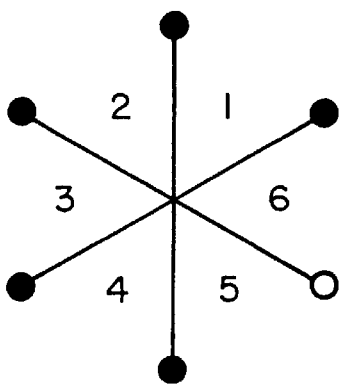
FIG_15e
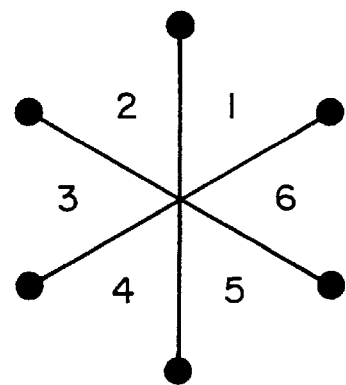
FIG_15f

METHOD AND SYSTEM FOR AUTOMATICALLY GENERATING PRINTER PROFILES

BACKGROUND

The present invention relates in general to computer systems, and in particular to peripheral devices used in computer systems. Still more particularly, the present invention relates to a method and system for automatically generating printer profiles.

As computing moves into the multimedia era, the days in which color was an unneeded luxury and monochrome monitors were commonplace, have given way to color image processing being an integral feature used by most applications. As the commercial demand for color grew, so too did the complexity of the hardware and software which was designed in response to that demand. Many color image processing techniques have been developed to deal with the issues raised by the integration of color into the computing paradigm.

Color matching is one such technique, which is used when transferring color images and documents between color devices, such as monitors, scanners and printers. Color matching is a useful interface technique because color devices have different color capabilities, describe color in different terms and operate in different color spaces. For example, a color display monitor in a computer system may create and describe colors in terms of red, green and blue ("rgb") values, and is then said to work in the RGB color space. The rgb values for this display monitor are device dependent, meaning the rgb values are particular for that monitor or brand of monitor. Because the rgb values are device dependent, colors displayed on different monitors will probably not be visually identical even for the same rgb values.

Most printers create and describe colors in device dependent terms differing from monitors. Printers use, for example, cyan, magenta, yellow and black ("cmyk") values to describe colors, and are said to work in the CMYK color space. Again, because the cmyk values are device dependent, colors printed on any given printer will probably not match colors printed on a different printer for the same cmyk values.

Further complicating color matching between color devices is that different color devices have different color capabilities. Every color device, such as a scanner, printer, or monitor, has a range of colors that it can produce. This range of producible colors is known as a gamut. To exemplify the difficulties caused by differing device gamuts, consider monitors and printers. Those skilled in the art will recognize that color display monitors can produce and display hundreds to thousands of colors. Color printers, however, typically have a smaller number of printable colors. Consequently, in most situations the gamut for a color display monitor exceeds the gamut for a color printer. As a result some colors displayed on display monitors cannot be produced by color printers.

Color matching models translate colors between devices while trying to maintain the perceived color appearance. For example, suppose that a user creates an image on a monitor. If she or he prints this image without any color matching, the color appearance of the printed image will differ significantly from that of the original. Using a color matching model, this change can be reduced to a perceptionally acceptable level.

In addition to color matching models, device profiles are needed for each color device to be matched. These profiles describe the basic color characteristics of the device and include a minimum required set of parameters for the color matching model to use. By searching through the source and destination device profiles, a color matching model can translate the source colors into a device independent color space and from this space into the destination device color space. Therefore, every color device is provided with a device profile with the required information for at least a default color matching model, if a custom-designed color matching model is not being used. In order to provide the best results, this profile information needs to be optimized for the particular color matching model in use.

It has been found, however, that certain color matching models, such as the default color matching model shipped provided color devices produced by Apple Computer, Incorporated, located in Cupertino, Calif., are not well suited to converting from one color space to another, particularly with respect to printers, due to certain assumptions about the linearity of color transformations which are implicit in these models. These assumptions, and an exemplary default color matching model, are described in more detail in the detailed description that follows.

Printer profiles have been conventionally created by the manual measurement of printed test patches to produce colorant values and tone reproduction tables. Due to the weakness of some conventional models, these printer profiles have been manually adjusted to obtain the proper colorant matrices so that the color conversions are perceptionally acceptable. Since this manual adjustment is very time consuming (on the order of a week to set up a profile for a printer) and costly, it would be desirable to overcome the problems caused by these default models. Although one solution would be to create a better color matching model, many color devices have already been produced which operate using models which are integral with color conversion systems that would be commercially inviable to replace.

SUMMARY

According to the present invention, methods and systems are provided which automate profile generation and optimize colorant matrices. By creating, printing and measuring a digital target of, for example, less than 200 sample colors, the linearization look-up table (LUT) can easily be obtained from grey scale values in this target. Furthermore, the sample colors provide a database of colors in each hextant which can be used in a multiple nonlinear regression to find the optimal colorant values for the profile matrices. Since CIEXYZ space is perceptually nonlinear, simple least squares regression is inadequate and a new loss function based on the CIELAB $\Delta E^*$ color difference equation is used. In this way any resulting errors are evenly distributed within each hextant on a perceptual basis.

An ideal regression would involve solving for all six colorant values at once, where each colorant value has three values representing their CIEXYZ measurements. Unfortunately, this would create $3^{(6*3)}$ or 387,420,489 degrees of freedom which is a computationally unreasonable solution given the iterative nature of regression analysis. Instead, a progressive solution is provided according to exemplary embodiments of the present invention where one hextant, with its two colorant values, is regressed and then an adjacent hextant is regressed, with one colorant value already solved, until the last colorant value is left with two hextants of data used for its solution.

BRIEF DESCRIPTION OF THE DRAWINGS

The present invention, as well as exemplary embodiments thereof, and further objects and advantages thereof, will best be understood by reference to the following detailed description of an illustrative embodiment when read in conjunction with the accompanying drawings, wherein:

FIG. 1 illustrates a computer system which may be used to implement the method and system for automatically generating printer profiles according to the present invention;

FIGS. 2a and 2b are pictorial representations of a device gamut;

FIG. 3 is a block diagram illustrating the architecture of a color processing system according to the present invention;

FIG. 4 illustrates pictorially the transformations of color from a source device to a destination device by the Apple™ Color Matching Method;

FIG. 5(a) is a flow chart depicting the method of converting colors from CIEXYZ independent color space to a color space of a destination printer device according to the Apple™ Color Matching Method;

FIG. 5(b) is an illustration of exemplary maximum, middle, and minimum cmy values for each hex;

FIG. 6 is a high level flowchart illustrating the method for automatically generating printer profiles according to the present invention;

FIG. 7 is a flowchart depicting the process of block 66 in FIG. 6;

FIG. 8 is a flowchart illustrating the process of block 70 in FIG. 6;

FIG. 9 is a flowchart depicting the process of block 72 in FIG. 6;

FIG. 10 is a flowchart illustrating the process of block 114 in FIG. 9;

FIG. 11 is a flowchart depicting the process of block 74 in FIG. 6;

FIG. 12 is a flowchart illustrating the process of block 76 in FIG. 6;

FIG. 13 is a flowchart illustrating the process of block 164 in FIG. 12;

FIG. 14 is a flowchart depicting the process of block 174 in FIG. 13;

FIGS. 15(a)–(f) depict the regression process for each hextant of the device color space according to the present invention; and FIG. 16 is a flowchart illustrating the process of block 78 in FIG. 6.

DETAILED DESCRIPTION

With reference now to the figures and in particular with reference to FIG. 1, a computer system is illustrated which may be used to implement the method and system for automatically generating printer profiles according to the present invention. Computer system 10 includes a computer 12, keyboard 14, a color display monitor 16 having a display screen 18, a cursor control device 20, shown here as a mouse, and a printer 22. Computer system 10 may be implemented using any suitable computer, such as a Macintosh Quadra™ computer, a product of Apple Computer, Incorporated, located in Cupertino, Calif. Printer 22 can be any color printer, such as a Color Stylewriter Pro™ printer also a product of Apple Computer, Incorporated.

FIG. 2a is a pictorial representation of a device gamut. For illustrative purposes, the gamut is shown in the shape of a hexcone. In this exemplary embodiment device, gamut 24 has six chromatic colorants, points $P_1$ through $P_6$. These points correspond to the colorants red, magenta, blue, cyan, green and yellow, respectively. Achromatic colorants, white and black, are located at the upper and lower ends of the gamut. These eight points, $P_1$ through $P_6$, white and black, define the volume of device gamut 24, and the volume represents the gamut of colors that can be produced or displayed on the device associated with gamut 24.

Those skilled in the art will recognize that the number of chromatic colorants in a device gamut may be a number other than six. For example, a device gamut may have only three chromatic colorants, such as red, green, and blue for a display monitor. FIG. 2b depicts device gamut 24 from the perspective of looking at the hexcone from above, at the white point, or below at the black point. This perspective will be used again when describing FIGS. 15(a)–15(f) to illustrate an exemplary method of automatically generating printer profiles according to the preferred embodiment.

Referring to FIG. 3, a block diagram illustrates the architecture of a color processing system according to an exemplary embodiment of the present invention. Color processing system 26 may include a plurality of source devices such as first display monitor 28, second display monitor 30, scanner 32, and other device 34. Other device 34 may be other real or virtual devices, such as a camera or color composition routines. Each of these source devices is a color device that can be added to or removed from color processing system 26. Source devices 28, 30, 32, 34 are examples of color devices that can provide color information to or receive color information from within color processing system 26 and those skilled in the art will appreciate that any other such color devices can also be interfaced with color system 26.

Color processing system 26 may also include a plurality of destination devices such as third display monitor 36, color printer 38, and other device 40. Other device 40 may be other real or virtual devices, such as a plotter or color composition routines. Like source devices 28, 30, 32, 34, each of the destination devices is a color device that can be added to or removed from color processing system 26. Destination devices 36, 38, 40 are examples of color devices that can provide color information to or receive color information from within color processing system 26.

Block 42 represents a color utility which can include a set of routines and data structures that enable color processing system 26 to match colors and communicate color information between the various source and destination devices. An example of such a utility is the Apple™ ColorSync™ Utility. Color information is transmitted between devices via a color profile. A color profile is a data structure that describes the basic color characteristics of the device. Color information described in a color profile includes data relating to the device's color space, gamut, tonal reproduction curves, and the preferred color matching method model (CMM).

A CMM is a component of color processing system 26. Color processing system 26 may have one or more CMMs. Blocks 44, 46, 48 represent three different CMMs within color processing system 26. One of the CMMs in color processing system 26 is typically a default, for example the Apple™ Color Matching Method included with ColorSync™. A CMM is where the conversion, or color matching, between differing color gamuts occurs. As described earlier, color matching matches the colors of the source color profile to the colors of the destination color profile.

To perform color matching in color processing system 26, the utility 42 calls one or more CMMs 44, 46, 48 via component manager 50. The color matching process will be described by way of example. Suppose that a color image displayed on first display monitor 28 is to be printed on printer 38, and the user wants color matching to occur. The application or device driver (not shown) for first display monitor 28 calls the utility 42 and transmits the color profile of first display monitor 28. The color profile for first display monitor 28 is the source color profile. The utility 42 also obtains the color profile from the device driver (not shown) for printer 38. The color profile for printer 38 is the destination color profile.

The utility 42 then transfers the color profiles for first display monitor 28 and printer 38 to component manager 50. Component manager 50 examines the source and destination color profiles and calls one or more CMMs to perform color matching. How many CMMs are called depends upon whether or not the source color profile and the destination color profile can use the same CMM for color matching. Once color matching is completed, the color image is printed on printer 38.

FIG. 4 illustrates pictorially the transformations of color from a source device to a destination device by the default CMM, for example, the Apple™ Color Matching Method. Display monitor 52 or scanner 54 are possible source color devices, and printer 56 and display monitor 58 are possible destination color devices. As discussed with reference to FIG. 1, color devices have different color capabilities, describe color in different terms and operate in different color spaces. Color data from the source color devices 52, 54 and the destination color devices 56, 58 are described in device dependent terms. Consequently, this default CMM first converts the color data from the device dependent color space within source color devices 52, 54 to a device independent color space 60. The color data is then converted from the independent color space 60 to the device dependent destination color space within destination color devices 56, 58.

Independent color space 60 is shown in FIG. 4 as CIE XYZ space. The XYZ space allows colors to be expressed as a mixture of three tristimulus values, X, Y, and Z. The term tristimulus comes from the notion that the way color is perceived results from the retina of the eye responding to three types of stimuli; one that affects the cones, one that affects the rods, and one that affects both. In 1931 the Commission Internationale de L'Eclairage (CIE) surveyed color data that was available and developed a space for color. The CIE set up a hypothetical set of primaries, XYZ, that correspond to the way the retina behaves. Because these primaries are based on perceived color, they map all visible light into a positive mixture of X, Y and Z.

Generally, the mixtures of X, Y, and Z used to describe a color are expressed as percentages ranging from 0% to 100%. The permissible range of values for X, Y and Z can be 0 (0%) to 65, 535 (100%) which values are termed chromaticity coordinates.

Referring to FIG. 5(a), a flow chart depicts the method of converting colors from CIEXYZ independent color space to a color space of a destination printer device according to the default Apple™ Color Matching Method. The CIE XYZ colors are first converted into a KPS (black, primary and secondary) representation using a 3×3 matrix optimized to the appropriate hextant. An exemplary technique for accomplishing this conversion is disclosed in U.S. Patent application Ser. No. 07/854,309 to Robin Myers et al, filed on Mar. 19, 1992 and entitled "Color Matching Apparatus and Method", which disclosure is incorporated here by reference. The hextant description and selection process will be described later. The KPS representations are converted into linear (with respect to CIE XYZ) cyan, magenta and yellow (CMY) representations using the following addition formulae:

max=K mid=max–P min=mid–S, where max, mid and min values for each hex comprises the specific cyan, magenta and yellow values as illustrated in FIG. 5(b).

The linear CMY representations are then converted into a device cmy representation using one dimensional lookup tables. The device cmy is linear with respect to the actual printer device space colorants. Finally, the cmy representation can be converted into rgb (red, green and blue) representations if the printer operates in the RGB color space, e.g., a QuickDraw printer. If the printer is a source device, this process is simply inverted with inverted lookup tables and matrices.

FIG. 6 is a high level flowchart depicting an exemplary method for automatically generating printer profiles according to the present invention. Prior to the first step, a test target is created. This test target can be created using any one of a number of off-the-shelf graphic packages which can provide the target both in a printed form and as a stored test target file, for example, a text file. The test target contains, for example, a gray scale and at least three color samples within or on the borders of each subdivision of the device color space. For example, if the device color space is defined by the colors black, white, red, magenta, blue, cyan, green and yellow, then each hextant of the device color space should have at least three samples in the target.

The number and types of samples printed on the test target have a direct impact on the profile results since the derived colorant values minimize the perceptible color error between the measured and predicted sample colors in each hex. By increasing the number of different color samples in each hex, a better average can be attained. Additionally, one can weight certain colors such as flesh tones, blue sky and green grass simply by including more samples of these colors in the target.

At block 62, the first step in this exemplary method is to print the target file using the target printer. Since the paper stock and other user controllable printer settings can affect the output, care needs to be used to setup the printer in a desired manner for the profile being produced. All color matching functions should be turned off when printing the target in order to assure accurate modeling of the raw printer response.

The second step is to measure the color spectra of the printed target as noted in block 64. While many possible measurement setups are feasible, one exemplary technique is described in the ANSI/CGATS.5-1993 "Graphic technology—Spectral measurement and colorimetric computation for graphic arts images" standard which is incorporated here by reference. This data is then stored in a test target color spectral data file.

The third step 66 is to setup the target parameters. This step is further broken down into its component tasks in FIG. 7. Therein, the total number of samples 80, the location of the eight pure colorant values 82 (white, black, cyan, magenta, yellow, red, green and blue), the number and location of the gray scale samples 84, and the number and location of any samples to be ignored in the analysis 85 are established. By allowing some samples to be ignored at block 86, a single test target can be created and used for multiple profiles such as profiles optimized for photographic images versus business graphics images. Step four, at block 68, is to read the device test target file in order to maintain a list of device color space values for each test target sample.

The fifth step 70 generates relative XYZ tristimulus values from the test target color spectra data file. This step is illustrated in more detail by the flow chart of FIG. 8. First the appropriate standard observer/illuminant weights are computed or retrieved at block 88 for the wavelengths of interest. These weights can be found, for example, in the aforementioned ANSI CGATS.5-1993 document at pages 6 and 7. The interested reader is also referred to the publication entitled CIE publication 15.2-1986 entitled "Colorimetry" (hereinafter referred to simply as "CIE 15.2") which disclosure is also incorporated here by reference.

Next, the test target color spectral data file created at step 64 is opened for reading at block 90. The exemplary implementation described below is based on data files generated from an internal measurement utility, i.e., a colorimeter or spectral photometer built into the printer, however, those skilled in the art will appreciate that many other setups could be used as long as the basic process of creating relative XYZ tristimulus values is maintained. In fact, relative XYZ tristimulus values could be manually measured using a colorimeter or spectral photometer and input into this method if desired.

For the current implementation a line of text is read from the target color spectral data file at block 92 and processed until the end of file is reached as indicated by decision block 94. Each line of text is parsed into individual tokens of text and each token is converted into a floating point number at step 96. These numbers are the actual reflection factors for the wavelength bands of the spectra for the current sample being processing (which corresponds to the current line of text being retrieved). At block 98, absolute X tristimulus values are obtained by using equation (1) below and plugging in the retrieved reflection factors and observer/illuminant weights. The summation ranges through the available wavelength bands, for example, 400 nm–700 nm.

$$X = \sum_{i=1}^{n} \text{reflectionfactor}_i \cdot \text{obsill\_weight\_}X_i \tag{1}$$

The absolute Y and Z tristimulus values are computed similarly. After computing the tristimulus values at block 98 a line of text is read from the target data file at block 92. Once the end of file has been reached the decision block 94 then proceeds to block 100 where the normalization factor is computed. Next a normalization factor is computed at step 100 by dividing 100 by the absolute Y tristimulus value of the white colorant sample. In this way, the background white of the paper stock is placed at a set value rather than being dependent upon the intensity of the light used in measurement. Finally, each absolute tristimulus value is converted into a relative tristimulus value by multiplication with the normalization factor at block 102.

The sixth step illustrated as block 72 in FIG. 6 builds the Cyan, Magenta, Yellow and Black (CMYK) tone response curves and the initial colorant values for the profile. The tone response curves define overall contrast and grey scale balance for the model, while the colorant values define the hue and chromaticness of the colors. This step is shown in more detail by the flow chart of FIG. 9. The gray scale samples along with the white and black colorant samples are copied into a gray scale array to simplify computations at 104. This array is normalized to a range from 0.0 to 1.0 as indicated by block 106 to simplify the computations.

If any of the values are out of this range (block 108) then an error is logged and the program exits at 110. This error indicates that gray samples are either lighter than the white sample or darker than the black sample, both representing problems. Next a raw gray scale is generated at block 112 by, for example, the following pseudo-code.

kpts=number of gray scale values+1(for white)+1(for black);

for(i=0;<kps;i++) rawtrc[i] =65535.0*(1.0–gsval[kpts–1–i]);

This raw gray scale converts CMYK values that are linear with respect to XYZ values into nonlinear device cmyk values. This would be adequate if the raw device gray scale appeared perceptually linear in lightness, i.e., if the right contrast was achieved. In practice, however, most devices do not achieve proper contrast without further gray scale adjustment.

Thus, a lightness gray scale is generated at block 114 which represents a gray scale that should appear linear in lightness. This step is illustrated in more detail in the flow chart of FIG. 10.

First, an initial lightness gray scale is generated at 115 by using the measured gray scale from the test target (gray in) plotted against L* out, L* out being calculated from the Y tristimulus values in a conventional manner (see CIE 15.2, section 4.2.2). Next, a CIELAB L* Aim scale (L* denoting the lightness parameter of a measured sample) is generated at block 122 which allows one to provide more or less contrast to the lightness gray scale, i.e., to provide more or less shadow detail. According to one exemplary embodiment, this scale can simply be defined as a line where L*in=L*out.

The initial lightness gray scale generated at block 114 is then inverted using interpolation to flip the input and output, and a correction array is created by interpolating the gray scale array and the CIELAB L* Aim scale at blocks 124 and 126, respectively. Next, at block 128, an inverted corrected gray scale is generated by interpolating the correction array created in the previous step and the inverted gray scale from step 124. Reversing the function at step 130, i.e., by setting the maximum L*in value equal to the minimum L*in value, etc., adjusts for the opposite ways in which L* and the printed test target quantize the scale from no colorant to black. This function is then inverted at step 132 to provide a corrected lightness gray scale.

An acceptable tone reproduction curve is generated by adding weighted versions of the raw gray scale from step 112 and the gray scale output from step 132 of FIG. 10 to ensure that neutral samples have not drifted too far away from true neutral during the previous processing. For example, a simple weighting could be the average of these curves. These weights are calculated at block 116 to ensure that when cyan, magenta and yellow linear values are requested in equal portions, the nonlinear cyan, magenta and yellow values are perceptually neutral. Cyan, magenta and yellow weights are computed to generate cyan, magenta and yellow tone reproduction curves by weighting the tone reproduction curve at block 118. If this tone reproduction characteristic already occurs within the raw printer, the black tone reproduction curve can simply be copied into the cyan, magenta and yellow tone reproduction curves. Finally, at block 120, the initial colorant values are set equal to the pure colorant sample values as a starting point for any changes to be implemented by this process.

The seventh step in FIG. 6 is identified by reference numeral 74 and creates an array of data for valid samples containing the box number, white, primary and secondary component values and the relative XYZ tristimulus values. This step is illustrated in more detail in FIG. 11. First the hextant cycling sequence is set at block 134. Since regression techniques push errors into subsequent computations, the first hex which is processed will provide the most perceptually accurate colors in subsequent printed images and the last hex processed will provide the least perceptionally accurate colors. Accordingly, the hex cycling sequence should be selected so that the best colorant values are generated for colors of interest for anticipated applications. For example, one may wish to provide the best perceptional accuracy to flesh tones, followed by green grass, followed by blue sky, in which case the hex cycling order would be 1, 2, 3 . . . with reference to FIG. 5(b).

Next, at block 136, the cmyk values are expanded to 256 entries so that subsequent processing can be performed by table look-up rather than by interpolation. The device red, green and blue values are converted to device cyan, magenta and yellow values by subtracting them from the maximum device value (for 8 bit devices this is 255) at 138.

Subsequently, these nonlinear cmy values are converted into linear CMY values at step 140 by looking-up those values in tables created by the tone reproduction curves generated in step 72. Then the appropriate hextant is identified for the color sample being operated on (or other subdivision of the gamut if more or fewer than six colorants are recognized) at step 142. If the color sample lies on the border of two hextants, then data is included in both.

The white, primary and secondary (WPS) values are computed at 144 using the following code:

white=(65535−max)/65535.0;

primary=(max−mid)/65535.0;

secondary=(mid−min)/65535.0;

Where max, mid and min correspond to the maximum, middle and minimum values of the linear CMY values. The hextant to which the color sample belongs is also based on the max and minimum values. For example, if the Cyan of the sample is at the maximum value and the Yellow is at the minimum value, the sample would belong to the Cyan/Blue hex. If a sample is on the border between two hexes, it is duplicated and identical WPSXYZ values are created for each hex. If a sample is neutral, i.e., if C=M=Y, then it is duplicated and inserted into all six hexes.

Before actually inserting the hWPSXYZ values into the array created at block 146, they are checked against the list of ignored samples and inserted only if they do not match any samples in this list at step 148. Alternately, one could check for ignored samples before reading the device target file at step 68 to avoid processing samples which will later be ignored. In any event, after the hWPSXYZ array is created it is sorted by hex values at step 150. Finally, the beginning index number and number of samples for each hex are computed from this sorted array to set up blocks of samples for subsequent processing.

The eighth step 76 in FIG. 6 is the multiple nonlinear regression used to compute the optimal colorant values for the profile. This step is illustrated in more detail in FIG. 12.

First, a starting hex is equated with a current hex variable at 154. The first hex is selected as described above. As each hex is looped through, the appropriate colorant values for that hex are computed. The regression parameters are initialized at block 158. Then the average delta E* values in the current hex for each of the possible color changes is computed at block 164. This step is illustrated in more detail in FIG. 13.

First, the colorant change value is initialized at 170. This change value will ultimately equal the amount of change desired in the initial colorant values to optimize the profile based on the differences between the printed samples and the device target file. The colorant values corresponding to this change value are computed at block 172 by adding the current colorant value and the change value. Then the average delta E* for each sample within the current hex for the colorant values determined at step 172 is computed and saved at 174. This process is expanded upon in FIG. 14.

Therein, the first step is to initialize the current sample variable to be the first sample in the current hex stored in the hWPSXYZ array and a running sum variable to be zero as shown in block 176. Estimated XYZ values are computed from the WPS values stored in the array and the current colorant values using matrix multiplication at step 178. Next the reference XYZ values, taken from the hWPSXYZ array, and the estimated XYZ values are both converted into CIELAB values at block 180. This conversion can be performed, for example, as described in CIE 15.2, section 4.2.2.

At block 182, delta E* is determined using the estimated and reference CIELAB values from step 180. This value is added to the running sum variable at 184, if this was not the last sample in the current hex (block 186), the sample number is incremented at 187 and the above process repeated until no more samples remain. Then the average delta E* value is computed using by dividing the running sum by the number of samples in the hex at 188. The equation used for computing the delta E* value and converting from XYZ values into CIELAB values are based on CIE 15.2 which is an ISO standard and which disclosure has already been incorporated by reference. By calculating the loss function in the CIELAB color space, which is linear with respect to lightness, the perceptual errors which are measured by that loss function are diffused throughout the hexes in a perceptually even manner.

Looking back to FIG. 13, the average delta E* value is saved and the colorant change value is incremented at block 190. If no other possible colorant change values exist at 192, then the flow returns to the calling routine, i.e., FIG. 12, at block 194.

Turning back now to FIG. 12, step 164 is followed by a computation of the minimum average delta E* value and corresponding colorant values at 166, to spread out any errors so as to reduce the perceptibility of those errors. At 160, if the values determined in blocks 164 and 166 are within the regression limits, then the results are satisfactory and the process moves on to the next hex at block 162. The regression limits can be established based on the amount of time available for the calculations and the desired distribution of errors. If this is the next to last hex, then the colorants have all been optimized and this subroutine ends by returning to the main routine, i.e., FIG. 6, at block 168. Otherwise, another iteration is performed on the next hex's data.

The process described above with respect to FIGS. 12–14 is diagrammatically illustrated in FIGS. 15(a)–15(f). In FIG. 15(a), the initial state is shown wherein all of the possible colorant values, six in this example, have not yet been optimized as illustrated by an unfilled circle. Then, in FIG. 15(b), data from the first hex is used to compute both colorant values associated therewith. An adjacent hex, hex 2 in this example, is next used to compute the one unknown colorant related thereto as seen in FIG. 15(c) and so on until the next to last hex is reached at FIG. 15(e). Here, data from both the next to last hex (hex 5 in this example) and the last hex (hex 6 in this example) is used to compute the single remaining unknown colorant.

In step 78 of FIG. 6 a profile is written into memory, for example on the hard drive of computer 12 in FIG. 1 at a location which is readily accessible to various applications. This step is further described in the flow chart of FIG. 16. First, a profile structure template with default values is created at 196 and the computed tone reproduction curve values and the optimized colorant values are inserted therein at blocks 198 and 200 respectively. This structure is then saved in an appropriate file format, e.g., the ColorSync profile disk file format.

Finally, all subsequent printing by the color device having the newly saved profile is performed using the information stored in that profile to obtain optimized color matching as shown in step 79 of FIG. 6. According to the present invention, errors which are caused by the necessarily imperfect translation of one color space into another are distributed in an evenly perceptual manner, making them less noticeable to the observer. Moreover, since many of these steps are automated in that they can be performed by a computer system, the time for creating such profiles is dramatically reduced.

While the invention has been particularly shown and described with reference to a preferred embodiment, it will be understood by those skilled in the art that various changes in form and detail may be made therein without departing from the spirit and scope of the invention.

What is claimed is:

1. A method for operating a color printer comprising the steps of:
   printing a target having a plurality of color samples thereon;
   measuring a color spectra for each of said plurality of color samples;
   generating tristimulus values from said measured color spectra;
   establishing tone reproduction curves and initial colorant values;
   creating an array of data for each of said plurality of color samples, including said tristimulus values associated therewith;
   regressing said initial colorant values for each hextant of a color space of said color printer using said data from said array;
   storing a plurality of optimized colorant values calculated from said regression step as a profile; and
   printing images on said printer using said profile.

2. A method for operating a color printer comprising the steps of:
   defining a color space of said color printer as a plurality of different color segments;
   selecting a first color segment;
   determining errors in printed color samples associated with said first color segment;
   varying colorant values associated with said first color segment to diffuse said errors over the color space;
   repeating said selecting, determining and varying steps for each of said plurality of different color segments to determine a plurality of varied colorant values; and
   printing images using said varied colorant values.

3. The method of claim 2, wherein said step of selecting further comprises the step of:
   selecting color segments based on a decreasing order of perceptional importance.

4. The method of claim 2, wherein said step of determining further comprises the step of:
   calculating a loss function which represents perceptual errors in a first color space.

5. The method of claim 4, wherein said step of varying further comprises:
   regressing said colorant values in a second color space.

6. A method for automatically generating printer profiles comprising the steps of:
   printing a target having a plurality of color samples thereon;
   measuring a color spectra for each of said plurality of color samples;
   generating colorimetric values which are representative of said measured color spectra;
   establishing tone reproduction curves and initial colorant values using said colorimetric values;
   regressing said initial colorant values for each hextant of a color space of a printer; and
   storing a plurality of optimized colorant values calculated from said regression step as a profile.

7. The method of claim 6, further comprising the step of:
   recording said measured color spectra as reflection factors in a spectral data file.

8. The method of claim 7, wherein said step of generating colorimetric values further comprises the steps of:
   reading reflection factors from said spectral data file; and
   multiplying said reflection factors by observer weights to generate tristimulus values as said calorimetric values.

9. The method of claim 6, wherein said step of establishing tone reproduction curves and initial colorant values further comprises the steps of:
   generating a raw gray scale;
   correcting said raw gray scale to provide a predetermined contrast level;
   creating said tone reproduction curves by weighting and adding said raw gray scale and said corrected raw gray scale; and
   setting said initial colorant values equal to corresponding measured color samples.

10. The method of claim 6, further comprising the step of:
    defining a color space of said printer as a plurality of different color segments.

11. The method of claim 10, wherein the step of regressing said initial colorant values further comprises the step of:
    ordering color segments for regression based on decreasing perceptional importance.

12. The method of claim 10, wherein the step of regressing further comprises the steps of:
    determining a colorant change value;
    computing a current colorant value based on said initial colorant value and said colorant change value; and
    computing a loss function based on said current colorant value.

13. The method of claim 12, wherein the step of regressing further comprises the steps of:
    calculate an average value of said loss function in a current color segment for each possible colorant change;
    determine is said average value is within predetermined regression limits;
    if so, move to the next color segment and begin regression in that segment; and
    if not, perform another regression.

14. The method of claim 6, wherein said step of regressing further comprises the steps of:
    determining colorant change values in a first color space; and
    calculating a loss function in a second color space.

15. The method of claim 14, wherein said first color space is XYZ and said second color space is CIELAB.

* * * * *

UNITED STATES PATENT AND TRADEMARK OFFICE
CERTIFICATE OF CORRECTION

PATENT NO. : 5,881,209

DATED : Mar. 9, 1999

INVENTOR(S) : Michael STOKES

It is certified that error appears in the above-identified patent and that said Letters Patent is hereby corrected as shown below:

```
In the claims, column 12, line 12, delete "calorimetric", insert
--colorimetric--.
```

Signed and Sealed this

Third Day of August, 1999

Attest:

Q. TODD DICKINSON

*Attesting Officer*

*Acting Commissioner of Patents and Trademarks*